US012052752B2

United States Patent
Wang

(10) Patent No.: US 12,052,752 B2
(45) Date of Patent: Jul. 30, 2024

(54) LOAD CONTROL METHOD AND APPARATUS, NETWORK DEVICE, AND TERMINAL

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 618 days.

(21) Appl. No.: 17/175,973

(22) Filed: Feb. 15, 2021

(65) Prior Publication Data

US 2021/0168857 A1 Jun. 3, 2021

Related U.S. Application Data

(63) Continuation of application No. PCT/CN2018/106994, filed on Sep. 21, 2018.

(51) Int. Cl.
*H04W 74/08* (2024.01)
*H04W 74/00* (2009.01)
*H04W 74/0833* (2024.01)
*H04W 80/02* (2009.01)

(52) U.S. Cl.
CPC ....... *H04W 74/006* (2013.01); *H04W 74/008* (2013.01); *H04W 74/0833* (2013.01); *H04W 80/02* (2013.01)

(58) Field of Classification Search
CPC ... H04W 74/00; H04W 72/232; H04W 36/26; H04W 68/00; H04W 74/04; H04W 74/08
See application file for complete search history.

(56) References Cited

U.S. PATENT DOCUMENTS

| 5,930,706 | A | 7/1999 | Raith |
| 2018/0110074 | A1 | 4/2018 | Akkarakaran et al. |
| 2018/0279375 | A1* | 9/2018 | Jeon ...................... H04W 72/23 |

FOREIGN PATENT DOCUMENTS

| CN | 102740493 A | 10/2012 |
| CN | 102781065 A | 11/2012 |
| CN | 103096495 A1 | 5/2013 |
| CN | 103188759 A | 7/2013 |
| CN | 108271214 A | 7/2018 |
| CN | 108271275 A | 7/2018 |
| CN | 108282895 A | 7/2018 |

(Continued)

OTHER PUBLICATIONS

The first Office Action of corresponding Chinese application No. 202110261702.5, dated Mar. 24, 2022.

(Continued)

*Primary Examiner* — Tu X Nguyen
(74) *Attorney, Agent, or Firm* — Ladas & Parry, LLP

(57) ABSTRACT

Embodiments of the present application provide a load control method and apparatus, a network device and a terminal, including: sending, by a network device, a system broadcast message, where the system broadcast message includes a first configuration parameter, and the first configuration parameter is used to control whether a terminal performs a two-step random access procedure.

20 Claims, 8 Drawing Sheets

(56) References Cited

FOREIGN PATENT DOCUMENTS

WO 2018085726 A1 5/2018

OTHER PUBLICATIONS

InterDigital Communications, R-168465, "Random Access Procedure in NR," 3GPP TSG-RAN WSG2 #96, Reno, USA, Nov. 14-18, 2016, entire document.

The second Office Action of corresponding Chinese application No. 202110261702.5, dated May 17, 2022 (machine translation by Google Translate).

The Decision of Rejection of corresponding Chinese application No. 202110261702.5, dated Jul. 1, 2022.

The EESR of corresponding European application No. 18934153.0, dated Jul. 13, 2021, all pages.

Sony:"2-step RACH to 4-step RACH fallback", 3GPP Draft; R2-1700137 2-4-Step-Fallback, 3rd Generation Partnership Project (3GPP), Mobile Competence Centre; 650, Route Des Lucioles; F-06921 Sophia-Antipolis Cedex; France, vol. RAN WG2, No. Spokane, USA; Jan. 17, 2017-Jan. 19, 2017 Jan. 17, 2017(Jan. 17, 2017), XP051210722, all pages.

The International Search Report of PCT application No. PCT/CN2018/106994, dated Jun. 19, 2019 and its English translation provided by WIPO.

The Written Opinion of PCT application No. PCT/CN2018/106994, dated Jun. 19, 2019 and its English Translation provided by Google Translate.

3rd Generation Partnership Project; Technical Specification Group Radio Access Network; NR; NR and NG-RAN Overall Description;Stage 2; 3GPP TS 38.300 V16.3.0 (Sep. 2020), entire document.

3rd Generation Partnership Project; Technical Specification Group Radio Access Network; NR; Medium Access Control (MAC) protocol specification; 3GPP TS 38.321 V16.2.1 (Sep. 2020), entire document.

3rd Generation Partnership Project; Technical Specification Group Radio Access Network; NR; Radio Resource Control (RRC) protocol specification; 3GPP TS 38.331 V16.2.0 (Sep. 2020), entire document.

* cited by examiner

A network device sends a system broadcast message, where the system broadcast message includes a first configuration parameter, and the first configuration parameter is used to control whether a terminal performs a two-step random access procedure — 401

FIG. 4

A terminal receives a system broadcast message sent by a network device, where the system broadcast message includes a first configuration parameter; the terminal determines, based on the first configuration parameter, whether to perform a two-step random access procedure — 501

FIG. 5

A network device detects that a load of a PRACH used to perform a two-step random access procedure exceeds a first threshold, then the network device sends first indication information to a terminal, where the first indication information instructs the terminal to perform a switching from the two-step random access procedure to a four-step random access procedure — 601

FIG. 6

A terminal receives first indication information sent by a network device; the terminal determines, based on the first indication information, to perform a switching from a two-step random access procedure to a four-step random access procedure — 701

FIG. 7

LOAD CONTROL METHOD AND APPARATUS, NETWORK DEVICE, AND TERMINAL

CROSS-REFERENCE TO RELATED APPLICATIONS

This application is a continuation of the International application PCT/CN2018/106994, filed on Sep. 21, 2018, entitled "LOAD CONTROL METHOD AND APPARATUS, NETWORK DEVICE, AND TERMINAL", the content of which is hereby incorporated by reference in its entirety.

TECHNICAL FIELD

Embodiments of the present application relate to the field of mobile communication technology and, in particular, relate to a load control method and apparatus, a network device and a terminal.

BACKGROUND

When a User Equipment (UE) accesses a network and obtains a Radio Resource Control (RRC) connection, a random access procedure is first required. A current random access procedure uses a four-step Random Access Procedure (4 step RACH). In order to shorten delay of the random access procedure and quickly enter the network to start a service, a two-step Random Access Procedure (2 step RACH) is proposed. In the 2 step RACH, resources for MSG3 are pre-configured. When many users use the 2 step RACH which leads to a relatively high load of 2 step RACH resources, collision probability will be increased, thereby further extending access delay.

SUMMARY

Embodiments of the present application provide a load control method and apparatus, a network device and a terminal.

A load control method provided by an embodiment of the present application includes:
  sending, by a network device, a system broadcast message, where the system broadcast message includes a first configuration parameter, and the first configuration parameter is used to control whether a terminal performs a two-step random access procedure.

A load control method provided by an embodiment of the present application includes:
  receiving, by a terminal, a system broadcast message sent by a network device, where the system broadcast message includes a first configuration parameter;
  determining, by the terminal based on the first configuration parameter, whether to perform a two-step random access procedure.

A load control method provided by an embodiment of the present application includes:
  detecting, by a network device, that a load of a Physical Random Access Channel (PRACH) used to perform a two-step random access procedure exceeds a first threshold, and sending, by the network device, first indication information to a terminal, where the first indication information instructs the terminal to perform a switching from the two-step random access procedure to a four-step random access procedure.

A load control method provided by an embodiment of the present application includes:
  receiving, by a terminal, first indication information sent by a network device;
  determining, by the terminal based on the first indication information, to perform a switching from a two-step random access procedure to a four-step random access procedure.

A load control apparatus provided by an embodiment of the present application includes:
  a first sending unit, configured to send a system broadcast message, where the system broadcast message includes a first configuration parameter, and the first configuration parameter is used to control whether a terminal performs a two-step random access procedure.

A load control apparatus provided by an embodiment of the present application includes:
  a first receiving unit, configured to receive a system broadcast message sent by a network device, where the system broadcast message includes a first configuration parameter;
  a determining unit, configured to determine, based on the first configuration parameter, whether to perform a two-step random access procedure.

A load control apparatus provided by an embodiment of the present application includes:
  a detecting unit, configured to detect that a load of a PRACH used to perform a two-step random access procedure exceeds a first threshold;
  a sending unit, configured to send first indication information to a terminal, where the first indication information instructs the terminal to perform a switching from the two-step random access procedure to a four-step random access procedure.

A load control apparatus provided by an embodiment of the present application includes:
  a receiving unit, configured to receive first indication information sent by a network device;
  a determining unit, configured to determine, based on the first indication information, a switching from a two-step random access procedure to a four-step random access procedure.

A network device provided by an embodiment of the present application includes a processor and a memory. The memory is configured to store a computer program, and the processor is configured to call and run the computer program stored in the memory to execute the aforementioned load control method.

A terminal provided by an embodiment of the present application includes a processor and a memory. The memory is configured to store a computer program, and the processor is configured to call and run the computer program stored in the memory to execute the aforementioned load control method.

A chip provided by an embodiment of the present application is configured to implement the aforementioned load control method.

Specifically, the chip includes: a processor, configured to call and run a computer program from a memory, so that a device installed with the chip executes the above-mentioned load control method.

A computer-readable storage medium provided by an embodiment of the present application is configured to store a computer program, where the computer program causes a computer to execute the above-mentioned load control method.

A computer program product provided by an embodiment of the present application includes computer program instructions, where the computer program instructions cause a computer to execute the aforementioned load control method.

A computer program provided by an embodiment of the present application causes a computer to execute the abovementioned load control method, when running on the computer.

Through the above technical solutions, a network side configures a load control parameter (i.e. the first configuration parameter) of the two-step random access procedure through system broadcast, and carries the first indication information to the terminal through a paging message or a random access response message, where the first indication information is used to instruct the terminal to determine whether to perform the switching from the two-step random access procedure to the four-step random access procedure. In this way, load control of 2 step RACH resources is realized and the load of 2 step RACH resources is prevented from being too high, thereby reducing conflict probability of user access.

BRIEF DESCRIPTION OF DRAWINGS

The accompanying drawings described herein are used to provide a further understanding of the present application and constitute a part of the present application. The exemplary embodiments of the present application and descriptions thereof are used to explain the present application, and do not constitute an improper limitation of the present application. In the accompanying drawings:

FIG. 4 is a first schematic flowchart of a load control method provided by an embodiment of the present application;

FIG. 5 is a second schematic flowchart of a load control method provided by an embodiment of the present application;

FIG. 6 is a third schematic flowchart of a load control method provided by an embodiment of the present application;

FIG. 7 is a fourth schematic flowchart of a load control method provided by an embodiment of the present application;

DESCRIPTION OF EMBODIMENTS

The technical solutions in embodiments of the present application will be described below in conjunction with the drawings in the embodiments of the present application. Obviously, the described embodiments are a part of the embodiments of the present application, not all of the embodiments. Based on the embodiments in the present application, all other embodiments obtained by those of ordinary skill in the art without creative effort shall fall within the protection scope of the present application.

The technical solutions of the embodiments of the present application can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide interoperability for Microwave Access (WiMAX) communication system or a 5G system, etc.

Figure 1:
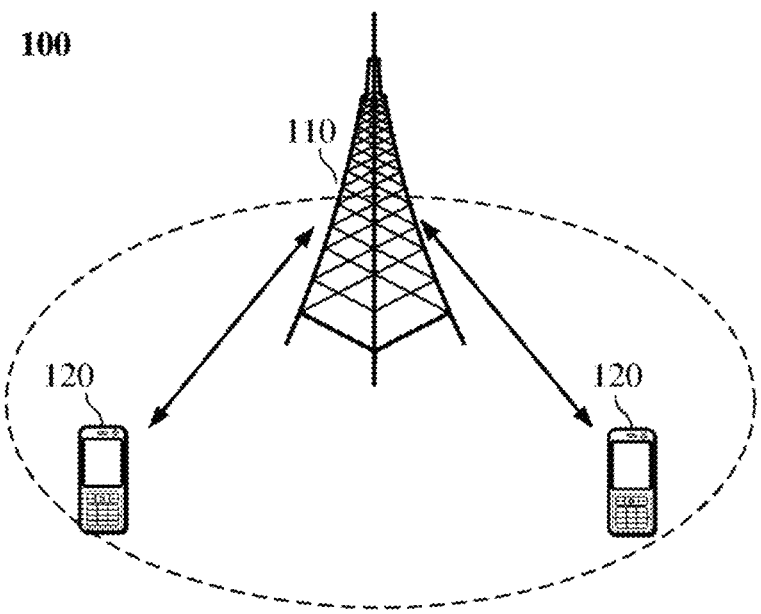
FIG. 1 is a schematic diagram of a communication system architecture provided by an embodiment of the present application.

Exemplarily, a communication system 100 to which the embodiments of the present application are applied is shown in FIG. 1. The communication system 100 can include a network device 110, and the network device 110 can be a device that communicates with a terminal 120 (or called a communication terminal or a terminal). The network device 110 can provide communication coverage for a specific geographic area, and can communicate with terminals located in the coverage area. Optionally, the network device 110 may be a base station (Base Transceiver Station, BTS) in a GSM system or a CDMA system, or a base station (NodeB, NB) in a WCDMA system, or an evolutional base station (Evolutional Node B, eNB or eNodeB) in an LTE system, or a wireless controller in a Cloud Radio Access Network (CRAN); or the network device may be a mobile switching center, a relay station, an access point, a vehicle-mounted device, a wearable device, a hub, a switch, a bridge, a router, a network side device in a 5G network, or a network device in a future evolutional Public Land Mobile Network (PLMN), etc.

The communication system 100 also includes at least one terminal 120 located within the coverage area of the network device 110. The "terminal" as used herein includes, but is not limited to, connections via a wired line, such as via a Public Switched Telephone Network (PSTN), a Digital Subscriber Line (DSL), a digital cable, and a direct cable connections; and/or via another data connection/network; and/or via a wireless interface, for example, for a cellular network, a Wireless Local Area Network (WLAN), a digital TV network such as a DVB-H network, a satellite network, an AM-FM broadcast transmitter; and/or via an apparatus of another terminal, configured to receive/send communication signals; and/or via an Internet Of Things (IoT) device. A terminal configured to communicate through a wireless interface may be referred to as a "wireless communication terminal", a "wireless terminal" or a "mobile terminal". Examples of the mobile terminal include, but are not limited to, a satellite or a cellular phone; a Personal Communications System (PCS) terminal that can combine a cellular radio phone with data processing, fax, and data communication capabilities; an PDA that can include a radio phone, a pager, an Internet/intranet access, a Web browser, a memo pad, a calendar and/or a Global Positioning System (GPS) receiver; and a conventional laptop and/or palmtop receiver or other electronic apparatuses including a radio telephone transceiver. The terminal can refer to an access terminal, a User Equipment (UE), a user unit, a user station, a mobile radio station, a mobile station, a remote station, a remote terminal, a mobile device, a user terminal, a terminal, a wireless communication device, a user agent or a user apparatus. The access terminal can be a cellular phone, a cordless phone, a Session Initiation Protocol (SIP) phone, a Wireless Local Loop (WLL) station, a Personal Digital Assistant (PDA), a handheld device with a wireless communication function, a computing device with a wireless communication function, or other processing devices connected to wireless modem and having a wireless communication function, an in-vehicle device, a wearable device, a terminal in the 5G network, or a terminal in the future evolutional PLMN, etc.

Optionally, a Device to Device (D2D) communication may be performed between terminals 120.

Optionally, the 5G system or the 5G network may also be referred to as a New Radio (NR) system or an NR network.

FIG. 1 exemplarily shows one network device and two terminals. Optionally, the communication system 100 may include multiple network devices and the coverage of each network device may include other numbers of terminals, which are not limited in the embodiments of the present application.

Optionally, the communication system 100 may also include other network entities, such as a network controller, a mobility management entity, which is not limited in the embodiments of the present application.

It should be understood that the device with a communication function in the network/system in the embodiments of the present application may be referred to as a communication device. Taking the communication system 100 shown in FIG. 1 as an example, the communication device may include the network device 110 and the terminal 120 with the communication function, and the network device 110 and the terminal 120 may be a specific device described above, which will not be repeated here. The communication device may also include other devices in the communication system 100, for example, other network entities such as a network controller, a mobility management entity, etc., which are not limited in the embodiments of the present application.

It should be understood that the terms "system" and "network" are often used interchangeably herein. The term "and/or" herein is only an association relationship for describing associated objects, and means that there can be three types of relationships. For example, the expression "A and/or B" may indicate three cases: A exists alone, A and B exist at the same time, and B exists alone. In addition, the character "/" herein generally indicates that the associated objects before and after the character are in an "or" relationship.

In order to meet people's pursuit of service rate, delay, high-speed mobility and energy efficiency, as well as diversity and complexity of services in future life, the 3rd Generation Partnership Project (3GPP) international standard organization began to develop the 5th Generation (5G) mobile communication technology.

The air interface part of the 5G mobile communication technology is called New Radio (NR). In early deployment of NR, it is difficult to achieve complete NR coverage. Therefore, a typical network coverage is a combination of Long Term Evolution (LTE) coverage and NR coverage. In addition, in order to protect early investment on LTE by mobile operators, a working mode of tight interworking between LTE and NR is proposed. Of course, an NR cell can also be deployed independently. In addition, since each NR cell is beam-operated, one cell has multiple beams.

The technical solutions of the embodiments of the present disclosure are mainly applied to the 5G mobile communication system. Of course, the technical solutions of the embodiments of the present disclosure are not limited to the 5G mobile communication system, but can also be applied to other types of mobile communication systems. Main application scenarios in the 5G mobile communication system are described in the following:

1) eMBB scenario: eMBB targets obtaining multimedia content, services and data by users, and service demand thereof is growing very rapidly. Since eMBB may be deployed in different scenarios, such as indoor, in an urban area, in a rural area, etc., service capabilities and requirements thereof vary greatly. Therefore, a service has to be analyzed in combination with a specific deployment scenario.

2) URLLC scenario: typical applications of URLLC include: industrial automation, power automation, telemedicine operation, traffic safety assurance, etc.

3) mMTC scenario: typical features of mMTC include: high connection density, small data volume, delay-insensitive services, low cost of modules, long service life, etc.

Figure 2:
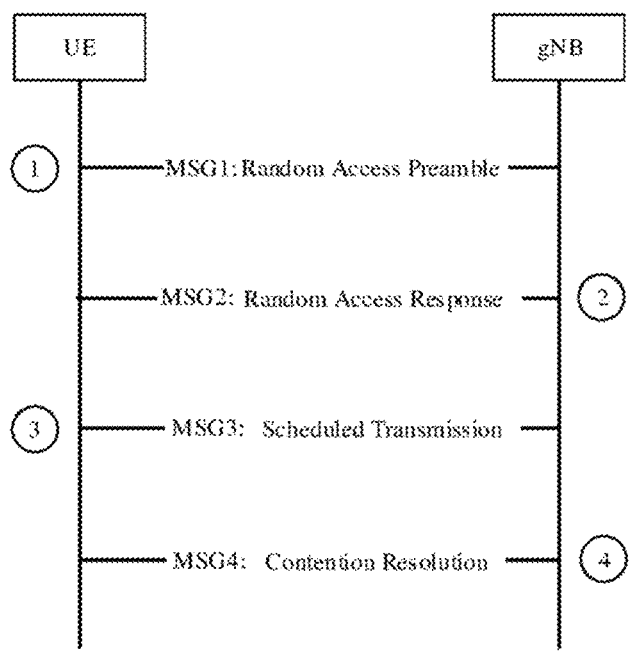
FIG. 2 is a flowchart of a four-step random access procedure.
Figure 3A:
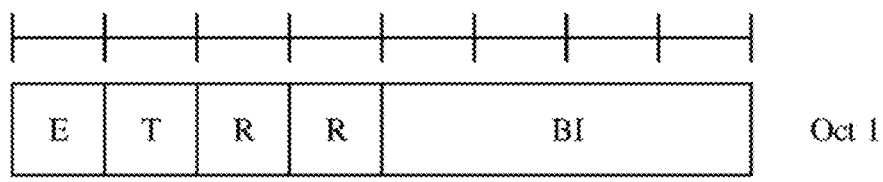
FIG. 3(a) is a format of an E/T/R/R/BI MAC subheader.
Figure 3B:
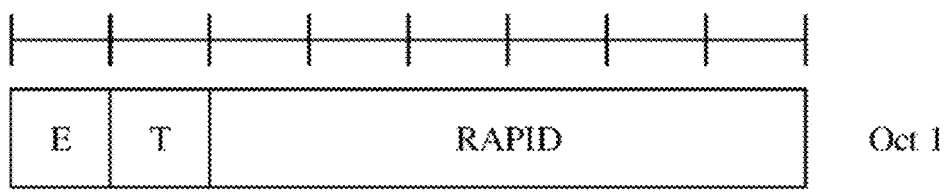
FIG. 3(b) is a format of an E/T/RAPID MAC subheader.
Figure 3C:
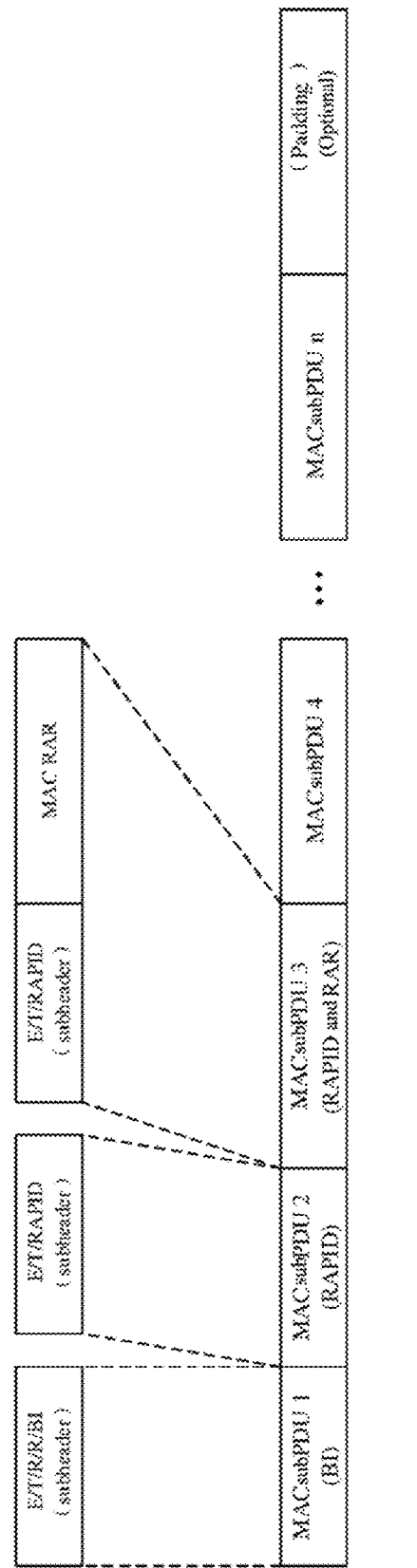
FIG. 3(c) is a format of a MAC PDU (including MAC RARs)
Figure 3D:
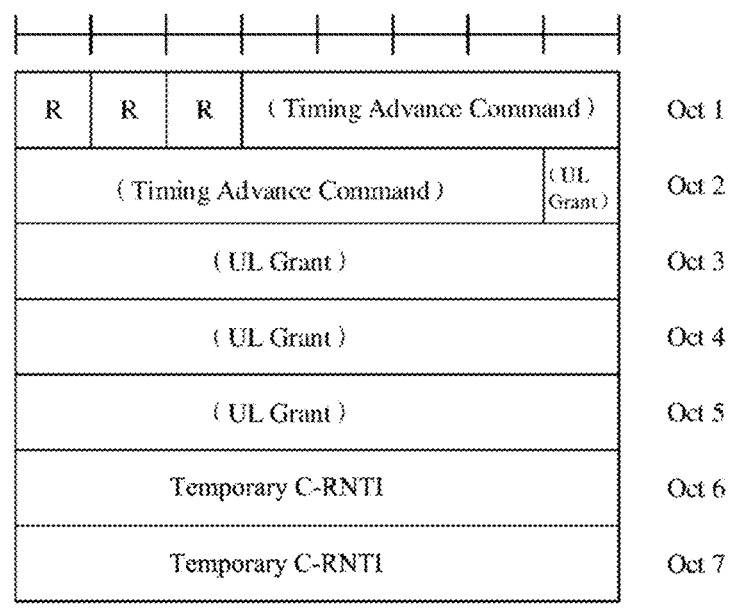
FIG. 3(d) is a schematic diagram of a MAC RAR.

A random access procedure is first required when a UE accesses a network and obtains an RRC connection. Refer to FIG. 2, FIG. 2 is a flowchart of a four-step random access procedure, including the following steps:

1. The UE sends, to a gNB, an MSG1: a Random Access Preamble.

Specifically, the UE selects a PRACH resource and sends a selected Preamble on the PRACH resource. Here, there are a total of 64 Preambles, and each Preamble corresponds to an index, and a value of the index ranges from 0 to 63.

2. The gNB sends, to the UE, an MSG2: a Random Access Response (RAR).

Specifically, the gNB replies to the MSG1 and sends a random access response to the UE, and the UE calculates, according to the PRACH resource for sending the Preamble, a random access-radio network temporary identifier (RA-RNTI) used to scramble scheduling information of the MSG2. A Media Access Control (MAC) layer data format of a RAR is shown in FIG. 3(*a*), FIG. 3(*b*), FIG. 3(*c*) and FIG. 3(*d*), among which FIG. 3(*a*) is a format of an E/T/R/R/BI MAC subheader, FIG. 3(*b*) is a format of an E/T/RAPID MAC subheader, FIG. 3(*c*) is a format of a Media Access Control Protocol Data Unit (MAC PDU) (including MAC RARs), and FIG. 3(*d*) is a schematic diagram of a MAC RAR.

3. The UE sends, to the gNB, an MSG3: scheduled transmission.

Specifically, in the MSG2, the network side will allocate an uplink resource to the UE for sending the MSG3, and the UE sends the MSG3 on the uplink resource (UL grant) allocated by the network side.

4. The gNB sends, to the UE, an MSG4: contention resolution.

In order to shorten delay of the random access procedure and quickly enter the network side to start a service, a two-step random access procedure is proposed. In the two-step random access procedure, an MSG1 and an MSG3 are sent at the same time or almost at the same time (the MSG3 can be sent without waiting for an MSG2 here), and an MSG2 and an MSG4 are sent together (one PDSCH transmission or two PDSCH transmissions).

In the two-step random access procedure, resources used to send the MSG3 are pre-configured, and the pre-configured resources are limited. In order to avoid resource waste, the two-step random access procedure will not configure many resources. On the other hand, the two-step random access procedure should ensure that a UE with a high delay requirement can use MSG3 resources normally. Therefore, when many users use the two-step random access procedure which leads to a relatively high resource load of the two-step random access procedure, conflict probability will be increased and access delay will be further expanded, so it is necessary to perform load control on the two-step random access procedure.

FIG. 4 is a first schematic flowchart 1 of a load control method provided by an embodiment of the present application. As shown in FIG. 4, the load control method includes the following step:

Step 401: a network device sends a system broadcast message, where the system broadcast message includes a first configuration parameter, and the first configuration parameter is used to control whether a terminal performs a two-step random access procedure.

In the embodiment of the present application, the network device may be a base station, such as a gNB in 5G or an eNB in 4G.

In the embodiment of the present application, the network device sends the system broadcast message by broadcasting. Here, the system broadcast message includes the first configuration parameter, and the first configuration parameter is used to control whether the terminal performs the two-step random access procedure.

In the embodiment of the present application, the first configuration parameter includes second indication information and a first control parameter, where:
- the second indication information is used to indicate whether the terminal is capable of performing the two-step random access procedure;
- the first control parameter is used to judge whether the terminal performs a switching from the two-step random access procedure to a four-step random access procedure, in a case that the second indication information indicates that the terminal is capable of performing the two-step random access procedure.

In an implementation, the second indication information includes a first bitmap. Each bit in the first bitmap corresponds to an Access Control (AC) value, and a value of the bit is used to indicate whether a terminal of the AC value corresponding to this bit is capable of performing the two-step random access procedure.

For example: the first bitmap is an AC bitmap, and each bit in the AC bitmap corresponds to a control of using the 2-step RACH for a UE of an AC value. For example, 10101 indicates control information of using the 2-step RACH by UEs of AC=11 to 15, then terminals of AC=11, 13, and 15 are capable of performing the 2-step RACH when accessing.

In an implementation, the first control parameter includes a first random number;

the judging whether the terminal performs the switching from the two-step random access procedure to the four-step random access procedure includes:
- if a second random number generated by the terminal is greater than or equal to the first random number, determining that the terminal performs the switching from the two-step random access procedure to the four-step random access procedure;
- if the second random number generated by the terminal is smaller than the first random number, determining that the terminal performs the two-step random access procedure.

For example: the gNB broadcasts a random number in system broadcast, and the number is between 0 and 1. The UE randomly generates a number from 0 to 1 and compares the same with the random number configured in the system broadcast. If the number generated by the UE is greater than the number in the system broadcast, then the UE falls back to the 4 step RACH, otherwise continues performing the 2 step RACH.

In an implementation, the network device detects that a load of a PRACH used to perform the two-step random access procedure exceeds a first threshold, then the network device sends first indication information to the terminal, where the first indication information is used to instruct the terminal to judge whether to perform the switching from the two-step random access procedure to the four-step random access procedure. Here, when the network side detects that the load of the PRACH of the 2-step RACH is relatively high, the network side sends the first indication information to the UE to instruct the UE to judge whether to perform a fallback from the 2-step RACH to the 4-step RACH.

In the embodiment of the present application, the network device may send the first indication information to the terminal in any of the following two manners:

Manner One:

The network device carries the first indication information in a random access response message sent to the terminal.

Further, a MAC PDU in the random access response message carries the first indication information. Here, the MAC PDU in the random access response message may be referred to as a RAR MAC PDU, and the RAR MAC PDU carries the first indication information for instructing the UE to judge whether to perform the fallback from the 2 step RACH to the 4 step RACH.

Manner Two:

The network device carries the first indication information in a paging message or paging Downlink Control Information (DCI) sent to the terminal.

Here, the first indication information is carried in the paging message, or the first indication information is carried in the paging DCI, for instructing the UE to judge whether to perform the fallback from the 2 step RACH to the 4 step RACH.

In the embodiment of the present application, the AC value of the UE can also instruct the UE to judge whether to perform the fallback from the 2 step RACH to the 4 step RACH. For example, a bit corresponding to the AC value of the UE is determined to be 1 based on the AC bitmap, which represents that the UE is capable of performing the 2 step RACH, that is, the AC value instructs the UE to judge whether to perform the fallback from the 2 step RACH to the 4 step RACH. If the UE receives the first indication information sent by the network device, and the AC value of the UE also indicates that it is needed to judge whether to perform the fallback from the 2 step RACH to the 4 step RACH, the UE judges whether to perform the 2 step RACH according to the random number in the system broadcast. For example, the UE randomly generates a number from 0 to 1 and compares the same with the random number configured in the system broadcast. If the number generated by the UE is greater than the number in the system broadcast, then the UE falls back to the 4 step RACH, otherwise continues performing the 2 step RACH.

It should be noted that each user is randomly assigned an AC value from 0 to 9. The AC value is stored in a SIM card. Some special users may have one or more AC values from 11 to 15, which are also stored in the SIM card. A user having an AC value of 11 to 15 generally has a higher priority. However, the size of the AC value does not represent the order of priority.

FIG. 5 is a second schematic flowchart of a load control method provided by an embodiment of the present application. As shown in FIG. 5, the load control method includes the following step:

Step 501: a terminal receives a system broadcast message sent by a network device, where the system broadcast message includes a first configuration parameter; the terminal determines, based on the first configuration parameter, whether to perform a two-step random access procedure.

In the embodiment of the present application, the network device may be a base station, such as a gNB in 5G or an eNB in 4G.

In the embodiment of the present application, the network device sends the system broadcast message by broadcasting. Here, the system broadcast message includes the first configuration parameter, and the first configuration parameter is used to control whether the terminal performs the two-step random access procedure.

In the embodiment of the present application, the first configuration parameter includes second indication information and a first control parameter, where:
  the second indication information is used to indicate whether the terminal is capable of performing the two-step random access procedure;
  the first control parameter is used to judge whether the terminal performs a switching from the two-step random access procedure to a four-step random access procedure, in a case that the second indication information indicates that the terminal is capable of performing the two-step random access procedure.

In an implementation, the second indication information includes a first bitmap. Each bit in the first bitmap corresponds to an AC value, and a value of the bit is used to indicate whether a terminal of the AC value corresponding to this bit is capable of performing the two-step random access procedure.

For example: the first bitmap is an AC bitmap, and each bit in the AC bitmap corresponds to a control of using the 2-step RACH control for a UE of an AC value. For example, 10101 indicates control information of using the 2-step RACH by UEs of AC=11 to 15, then terminals of AC=11, 13, and 15 are capable of performing the 2-step RACH when accessing.

In an implementation, the first control parameter includes a first random number;
  the judging whether the terminal performs the switching from the two-step random access procedure to the four-step random access procedure includes that: if the terminal receives first indication information sent by the network device, the terminal determines, based on the first configuration parameter, whether to perform the two-step random access procedure. Further, if a second random number generated by the terminal is greater than or equal to the first random number, then it is determined that the terminal performs the switching from the two-step random access procedure to the four-step random access procedure; if the second random number is smaller than the first random number, then it is determined that the terminal performs the two-step random access procedure.

For example: the gNB broadcasts a random number in system broadcast, and the number is between 0 and 1. The UE randomly generates a number from 0 to 1 and compares the same with the random number configured in the system broadcast. If the number generated by the UE is greater than the number in the system broadcast, then the UE falls back to the 4 step RACH, otherwise continues performing the 2 step RACH.

In an implementation, the terminal receives first indication information sent by the network device, where the first indication information is used to instruct the terminal to determine whether to perform the switching from the two-step random access procedure to the four-step random access procedure. Here, when the network side detects that a load of a PRACH of the 2-step RACH is relatively high, the network side sends the first indication information to the UE to instruct the UE to determine whether to perform a fallback from the 2-step RACH to the 4-step RACH.

In the embodiment of the present application, the terminal may obtain the first indication information in any of the following two manners:

Manner One:
The terminal obtains the first indication information from a random access response message sent by the network device.

Here, a MAC PDU in the random access response message may be referred to as a RAR MAC PDU, and the RAR MAC PDU carries the first indication information for instructing the UE to judge whether to perform the fallback from the 2 step RACH to the 4 step RACH.

Manner Two:
The terminal obtains the first indication information from a paging message or paging DCI sent by the network device.

Here, the first indication information is carried in the paging message, or the first indication information is carried in the paging DCI, for instructing the UE to judge whether to perform the fallback from the 2 step RACH to the 4 step RACH.

In the embodiment of the present application, the AC value of the UE can also instruct the UE to judge whether to perform the fallback from the 2 step RACH to the 4 step RACH. For example, a bit corresponding to the AC value of the UE is determined to be 1 based on the AC bitmap, which represents that the UE is capable of performing the 2 step RACH, that is, the AC value instructs the UE to judge whether to perform the fallback from the 2 step RACH to the 4 step RACH. If the UE receives the first indication information sent by the network device, and the AC value of the UE also indicates that it is needed to judge whether to perform the fallback from the 2 step RACH to the 4 step RACH, the UE judges whether to perform the 2 step RACH according to the random number in the system broadcast. For example, the UE randomly generates a number from 0 to 1 and compares the same with the random number configured in the system broadcast. If the number generated by the UE is greater than the number in the system broadcast, then the UE falls back to the 4 step RACH, otherwise continues performing the 2 step RACH.

It should be noted that each user is randomly assigned an AC value from 0 to 9. The AC value is stored in a SIM card.

Some special users may have one or more AC values from 11 to 15, which are also stored in the SIM card. A user having an AC value of 11 to 15 generally has a higher priority. However, the size of the AC value does not represent the order of priority.

FIG. 6 is a third schematic flowchart of a load control method provided by an embodiment of the present application. As shown in FIG. 6, the load control method includes the following step:

Step 601: a network device detects that a load of a PRACH used to perform a two-step random access procedure exceeds a first threshold, then the network device sends first indication information to a terminal, where the first indication information instructs the terminal to perform a switching from the two-step random access procedure to a four-step random access procedure.

In the embodiment of the present application, the network device may be a base station, such as a gNB in 5G or an eNB in 4G.

In the embodiment of the present application, when the network side detects that the load of the PRACH of the 2-step RACH is relatively high, the network side sends the first indication information to a UE to instruct the UE to perform a fallback from the 2-step RACH to the 4-step RACH.

In the embodiment of the present application, the network device may send the first indication information to the terminal in any of the following two manners:

Manner One:

The network device carries the first indication information in a random access response message sent to the terminal.

Further, a MAC PDU in the random access response message carries the first indication information. Here, the MAC PDU in the random access response message may be referred to as a RAR MAC PDU, and the RAR MAC PDU carries the first indication information for instructing the UE to perform the fallback from the 2 step RACH to the 4 step RACH.

Manner Two:

The network device carries the first indication information in a paging message or paging DCI sent to the terminal.

Here, the first indication information is carried in the paging message, or the first indication information is carried in the paging DCI, for instructing the UE to perform the fallback from the 2 step RACH to the 4 step RACH.

FIG. 7 is a fourth schematic flowchart of a load control method provided by an embodiment of the present application. As shown in FIG. 7, the load control method includes the following step:

Step 701: a terminal receives first indication information sent by a network device; the terminal determines, based on the first indication information, to perform a switching from a two-step random access procedure to a four-step random access procedure.

In the embodiment of the present application, the network device may be a base station, such as a gNB in 5G or an eNB in 4G.

Here, when the network side detects that a load of a PRACH of the 2 step RACH is relatively high, the network side sends the first indication information to a UE to instruct the UE to perform a fallback from the 2 step RACH to the 4 step RACH.

In the embodiment of the present application, the terminal may obtain the first indication information in any of the following two manners:

Manner One:

The terminal obtains the first indication information from a random access response message sent by the network device.

Further, a MAC PDU in the random access response message carries the first indication information. Here, the MAC PDU in the random access response message may be referred to as a RAR MAC PDU, and the RAR MAC PDU carries the first indication information, for instructing the UE to perform the fallback from the 2 step RACH to the 4 step RACH.

Manner Two:

The terminal obtains the first indication information from a paging message or paging DCI sent by the network device.

Here, the first indication information is carried in the paging message, or the first indication information is carried in the paging DCI, for instructing the UE to perform the fallback from the 2 step RACH to the 4 step RACH.

In an implementation, the terminal performs the four-step random access procedure when initiating random access again after the current two-step random access procedure ends.

Figure 8:
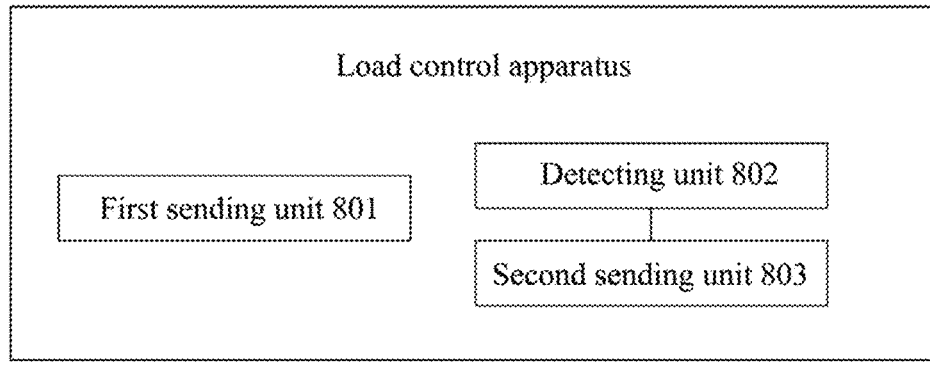
FIG. 8 is a first schematic diagram of structural composition of a load control apparatus provided by an embodiment of the present application.

FIG. 8 is a first schematic diagram of structural composition of a load control apparatus provided by an embodiment of the present application, which is applied to a network device, such as a base station. As shown in FIG. 8, the apparatus includes:

a first sending unit 801, configured to send a system broadcast message, where the system broadcast message includes a first configuration parameter, and the first configuration parameter is used to control whether a terminal performs a two-step random access procedure.

In an implementation, the apparatus further includes:

a detecting unit 802, configured to detect that a load of a PRACH used to perform the two-step random access procedure exceeds a first threshold;

a second sending unit 803, configured to send first indication information to the terminal, where the first indication information is used to instruct the terminal to judge whether to perform a switching from the two-step random access procedure to a four-step random access procedure.

In an implementation, the second sending unit 803 is configured to carry the first indication information in a random access response message sent to the terminal.

In an implementation, a MAC PDU in the random access response message carries the first indication information.

In an implementation, the second sending unit 803 is configured to carry the first indication information in a paging message or paging DCI sent to the terminal.

In an implementation, the first configuration parameter includes second indication information and a first control parameter, where, the second indication information is used to indicate whether the terminal is capable of performing the two-step random access procedure;

the first control parameter is used to judge whether the terminal performs the switching from the two-step random access procedure to the four-step random access procedure, in a case that the second indication information indicates that the terminal is capable of performing the two-step random access procedure.

In an implementation, the second indication information includes a first bitmap. Each bit in the first bitmap corresponds to an AC value, and a value of the bit is used to indicate whether a terminal of the AC value corresponding to this bit is capable of performing the two-step random access procedure.

In an implementation, the first control parameter includes a first random number;
  the judging whether the terminal performs the switching from the two-step random access procedure to the four-step random access procedure includes:
  if a second random number generated by the terminal is greater than or equal to the first random number, determining that the terminal performs the switching from the two-step random access procedure to the four-step random access procedure;
  if the second random number generated by the terminal is smaller than the first random number, determining that the terminal performs the two-step random access procedure.

Those skilled in the art should understand that the relevant description of the foregoing load control apparatus in the embodiments of the present application can be understood with reference to the relevant description of the load control method in the embodiments of the present application.

Figure 9:
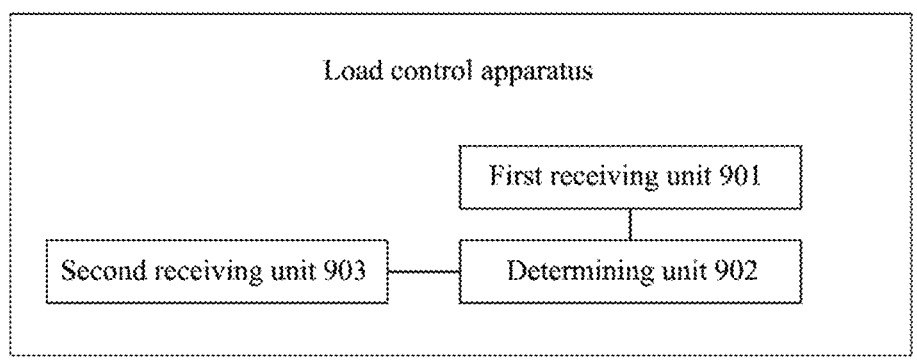
FIG. 9 is a second schematic diagram of structural composition of the load control apparatus provided by the embodiment of the present application.

FIG. 9 is a second schematic diagram of structural composition of a load control apparatus provided by an embodiment of the present application, which is applied to a terminal. As shown in FIG. 9, the apparatus includes:
  a first receiving unit 901, configured to receive a system broadcast message sent by a network device, where the system broadcast message includes a first configuration parameter;
  a determining unit 902, configured to determine, based on the first configuration parameter, whether to perform a two-step random access procedure.

In an implementation, the apparatus further includes:
  a second receiving unit 903, configured to receive first indication information sent by the network device, where the first indication information is used to instruct the terminal to determine whether to perform a switching from the two-step random access procedure to a four-step random access.

In an implementation, the second receiving unit 903 is configured to obtain the first indication information from a random access response message sent by the network device.

In an implementation, a MAC PDU in the random access response message carries the first indication information.

In an implementation, the second receiving unit 903 is configured to obtain the first indication information from a paging message or paging DCI sent by the network device.

In an embodiment, the first configuration parameter includes second indication information and a first control parameter, where,
  the second indication information is used to indicate whether the terminal is capable of performing the two-step random access procedure;
  the first control parameter is used to judge whether the terminal performs the switching from the two-step random access procedure to the four-step random access procedure, in a case that the second indication information indicates that the terminal is capable of performing the two-step random access procedure.

In an implementation, the second indication information includes a first bitmap. Each bit in the first bitmap corresponds to an AC value, and a value of the bit is used to indicate whether a terminal of the AC value corresponding to this bit is capable of performing the two-step random access procedure.

In an implementation, the first control parameter includes a first random number;
  the determining unit 902 is configured to, if the first indication information sent by the network device is received, determine, based on the first configuration parameter, whether to perform the two-step random access procedure.

In an implementation, the determining unit 902 is configured to: determine that the terminal performs the switching from the two-step random access procedure to the four-step random access procedure, if a second random number generated by the terminal is greater than or equal to the first random number; determine that the terminal performs the two-step random access procedure, if the second random number generated by the terminal is smaller than the first random number.

Those skilled in the art should understand that the relevant description of the foregoing load control apparatus in the embodiments of the present application can be understood with reference to the relevant description of the load control method in the embodiments of the present application.

Figure 10:
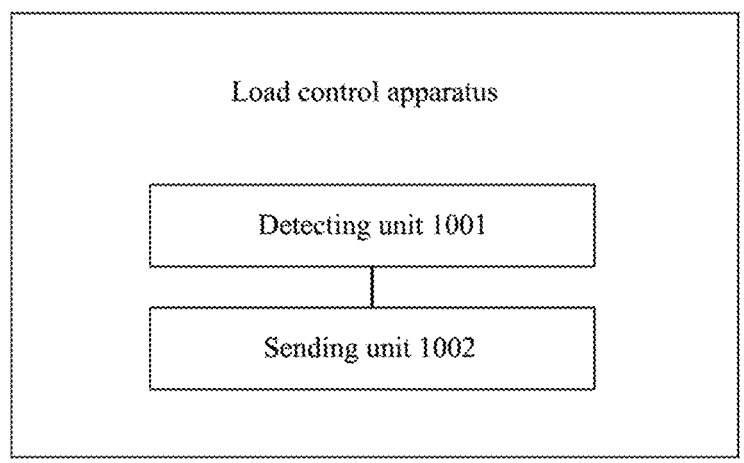
FIG. 10 is a third schematic diagram of structural composition of the load control apparatus provided by the embodiment of the present application.

FIG. 10 is a third schematic diagram of structural composition of a load control apparatus provided by an embodiment of the present application, which is applied to a network device, such as a base station. As shown in FIG. 10, the apparatus includes:
  a detecting unit 1001, configured to detect that a load of a PRACH used to perform a two-step random access procedure exceeds a first threshold;
  a sending unit 1002, configured to send first indication information to a terminal, where the first indication information instructs the terminal to perform a switching from the two-step random access procedure to a four-step random access procedure.

In an implementation, the sending unit 1002 is configured to carry the first indication information in a random access response message sent to the terminal.

In an implementation, the carrying the first indication information in the random access response message includes:
  carrying the first indication information in a MAC PDU in the random access response message.

In an implementation, the sending unit 1002 is configured to carry the first indication information in a paging message or paging DCI sent to the terminal.

Those skilled in the art should understand that the relevant description of the foregoing load control apparatus in the embodiments of the present application can be understood with reference to the relevant description of the load control method in the embodiments of the present application.

Figure 11:
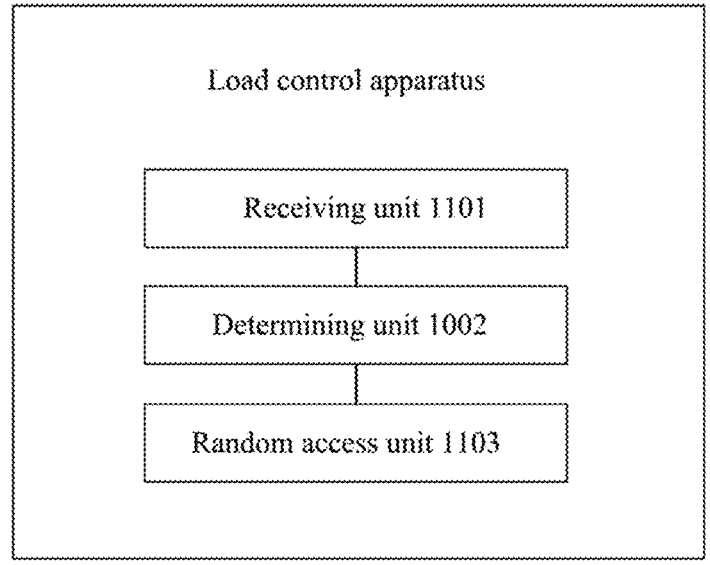
FIG. 11 is a fourth structural diagram of structural composition of the load control apparatus provided by the embodiment of the present application.

FIG. 11 is a fourth schematic diagram of structural composition of a load control apparatus provided by an embodiment of the present application, which is applied to a terminal. As shown in FIG. 11, the apparatus includes:
  a receiving unit 1101, configured to receive first indication information sent by a network device;
  a determining unit 1002, configured to determine, based on the first indication information, a switching from a two-step random access procedure to a four-step random access procedure.

In an implementation, the receiving unit 1101 is configured to obtain the first indication information from a random access response message sent by the network device.

In an implementation, a MAC PDU in the random access response message carries the first indication information.

In an implementation, the receiving unit 1101 is configured to obtain the first indication information from a paging message or paging DCI sent by the network device.

In an implementation, the apparatus further includes:

a random access unit 1103, configured to perform the four-step random access procedure when initiating random access again after the current two-step random access procedure ends.

Those skilled in the art should understand that the relevant description of the foregoing load control apparatus in the embodiments of the present application can be understood with reference to the relevant description of the load control method in the embodiments of the present application.

Figure 12:
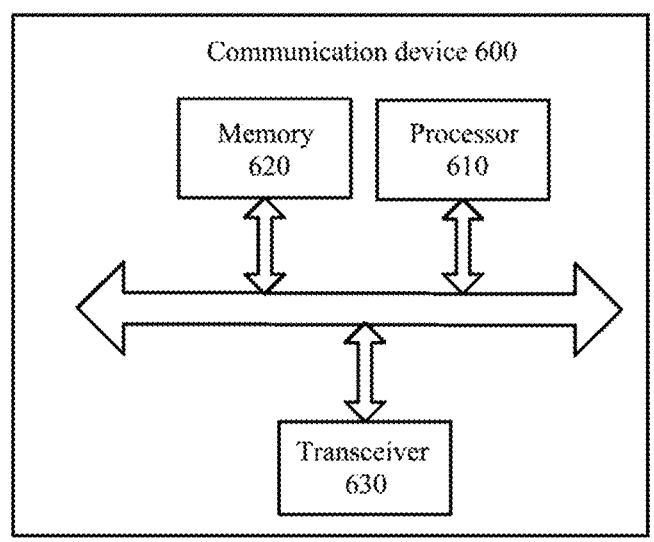
FIG. 12 is a schematic structural diagram of a communication device provided by an embodiment of the present application.

FIG. 12 is a schematic structural diagram of a communication device 600 provided by an embodiment of the present application. The communication device may be a network device or a terminal. The communication device 600 shown in FIG. 12 includes a processor 610, and the processor 610 can call and run a computer program from a memory to implement the methods in embodiments of the present application.

Optionally, as shown in FIG. 12, the communication device 600 can further include a memory 620. The processor 610 can call and run a computer program from the memory 620 to implement the methods in the embodiments of the present application.

The memory 620 may be a separate device independent of the processor 610, or may be integrated into the processor 610.

Optionally, as shown in FIG. 12, the communication device 600 can further include a transceiver 630, and the processor 610 can control the transceiver 630 to communicate with other devices. Specifically, the transceiver may send information or data to other devices, or receive information or data sent by other devices.

The transceiver 630 may include a transmitter and a receiver. The transceiver 630 may further include an antenna, and the number of the antennas may be one or more.

Optionally, the communication device 600 may specifically be a network device of embodiments of the present application, and the communication device 600 may implement corresponding processes implemented by the network device in respective methods of the embodiments of the application. For brevity, details are not repeated here.

Optionally, the communication device 600 may specifically be a mobile terminal/terminal according to embodiments of the present application, and the communication device 600 may implement corresponding processes implemented by the mobile terminal/terminal in respective methods of the embodiments of the present application. For brevity, details are not repeated here.

Figure 13:
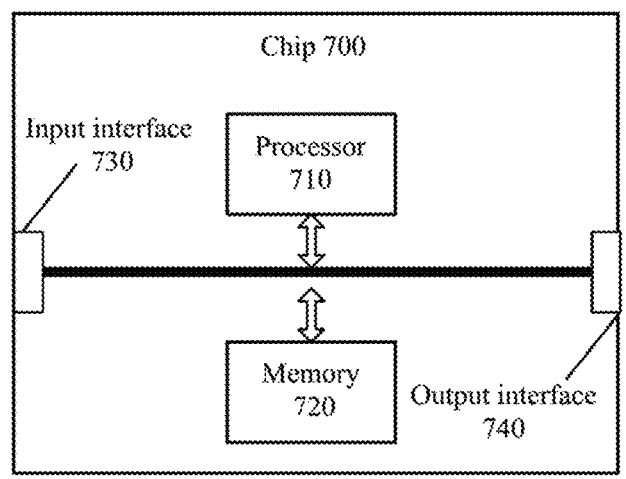
FIG. 13 is a schematic structural diagram of a chip of an embodiment of the present application.

FIG. 13 is a schematic structural diagram of a chip of an embodiment of the present application. The chip 700 shown in FIG. 13 includes a processor 710, and the processor 710 can call and run a computer program from a memory to implement the methods in embodiments of the present application.

Optionally, as shown in FIG. 13, the chip 700 can further include a memory 720. The processor 710 can call and run a computer program from the memory 720 to implement the methods in the embodiments of the present application.

The memory 720 may be a separate device independent of the processor 710, or may be integrated into the processor 710.

Optionally, the chip 700 can further include an input interface 730. The processor 710 can control the input interface 730 to communicate with other devices or chips, and specifically to obtain information or data sent by other devices or chips.

Optionally, the chip 700 can further include an output interface 740. The processor 710 can control the output interface 740 to communicate with other devices or chips, and specifically to output information or data to other devices or chips.

Optionally, the chip can be applied to the network device in the embodiments of the present application, and the chip can implement corresponding processes implemented by the network device in respective methods of the embodiments of the present application. For brevity, details are not repeated here.

Optionally, the chip can be applied to the mobile terminal/terminal in the embodiments of the present application, and the chip can implement corresponding processes implemented by the mobile terminal/terminal in respective methods of the embodiments of the present application. For brevity, details are not repeated here.

It should be understood that the chip mentioned in the embodiments of the present application may also be referred to as a system-level chip, a system-on-chip, a chip system, an SoC chip, or the like.

Figure 14:
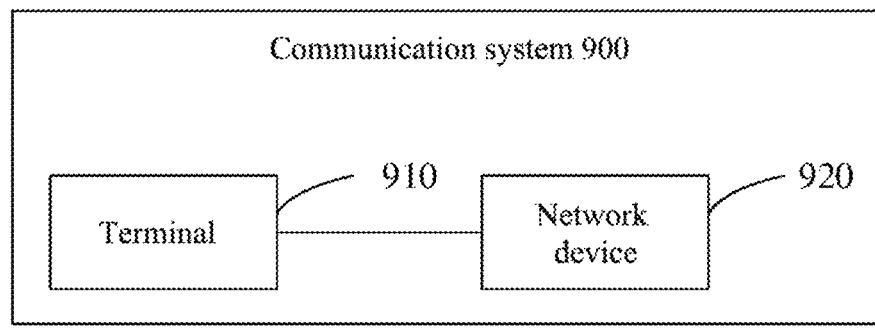
FIG. 14 is a schematic block diagram of a communication system provided by an embodiment of the present application.

FIG. 14 is a schematic block diagram of a communication system 900 provided by an embodiment of the present application. As shown in FIG. 14, the communication system 900 includes a terminal 910 and a network device 920.

The terminal 910 can be used to implement corresponding functions implemented by the terminal in the foregoing methods, and the network device 920 can be used to implement corresponding functions implemented by the network device in the foregoing methods. For brevity, details are not repeated here.

It should be understood that the processor of the embodiments of the present application may be an integrated circuit chip with signal processing capability. In the implementation process, the steps of the foregoing method embodiments can be completed by an integrated logic circuit in hardware of the processor or by instructions in the form of software. The above-mentioned processor may be a general-purpose processor, a Digital Signal Processor (DSP), an Application Specific Integrated Circuit (ASIC), a Field Programmable Gate Array (FPGA) or other programming logic devices, discrete gates or transistor logic devices, discrete hardware components, which can implement or perform the methods, steps, and logical block diagrams disclosed in the embodiments of the present application. The general-purpose processor may be a microprocessor, or the processor may also be any conventional processor or the like. The steps of the methods disclosed in the embodiments of the present application can be directly embodied as being executed and completed by a hardware decoding processor, or being executed and completed by a combination of hardware and software modules in a decoding processor. The software modules can be located in a mature storage medium in the art such as a random access memory, a flash memory, a read-only memory, a programmable read-only memory, an electrically erasable programmable memory, a register, etc. The storage medium is located in a memory, and the processor reads information in the memory and completes the steps of the above methods in combination with hardware thereof.

It can be understood that the memory in the embodiments of the present application may be a volatile memory or a non-volatile memory, or may include both volatile and non-volatile memories. The non-volatile memory may be a read-only memory (Read-Only Memory, ROM), a programmable read-only memory (Programmable ROM, PROM), an erasable programmable read-only memory (Erasable PROM, EPROM), and an electrically erasable programmable read-only memory (Electrically EPROM, EEPROM) or a flash memory. The volatile memory may be a random access memory (Random Access Memory, RAM), which is used as an external cache. By way of exemplary but not restrictive description, many forms of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM)) and a direct rambus random access memory (Direct Rambus RAM, DR RAM). It should be noted that the memories of the systems and methods described herein are intended to include, but are not limited to, these and any other suitable types of memories.

An embodiment of the present application also provides a computer-readable storage medium for storing a computer program.

Optionally, the computer-readable storage medium can be applied to the network device in the embodiments of the present application, and the computer program causes a computer to execute corresponding processes implemented by the network device in respective methods of the embodiments of the present application. For brevity, details are not repeated here.

Optionally, the computer-readable storage medium can be applied to the mobile terminal/terminal in the embodiments of the present application, and the computer program causes the computer to execute corresponding processes implemented by the mobile terminal/terminal in respective methods of the embodiments of the present application. For brevity, details are not repeated here.

An embodiment of the present application also provides a computer program product, including computer program instructions.

Optionally, the computer program product can be applied to the network device in the embodiments of the present application, and the computer program instructions cause a computer to execute corresponding processes implemented by the network device in respective methods of the embodiments of the present application. For brevity, details are not repeated here.

Optionally, the computer program product can be applied to the mobile terminal/terminal in the embodiments of the present application, and the computer program instructions cause the computer to execute corresponding processes implemented by the mobile terminal/terminal in respective methods of the embodiments of the present application. For brevity, details are not repeated here.

An embodiment of the present application also provides a computer program.

Optionally, the computer program can be applied to the network device in the embodiments of the present application. When the computer program runs on a computer, the computer is caused to execute corresponding processes implemented by the network device in respective methods of the embodiments of the present application. For brevity, details are not repeated here.

Optionally, the computer program can be applied to the mobile terminal/terminal in the embodiments of the present application. When the computer program runs on the computer, the computer is caused to execute corresponding processes implemented by the mobile terminal/terminal in respective methods of the embodiments of the present application. For brevity, details are not repeated here.

A person of ordinary skill in the art may realize that the units and algorithm steps of the examples described in combination with the embodiments disclosed herein can be implemented by electronic hardware, or a combination of computer software and electronic hardware. Whether these functions are executed by hardware or software depends on specific applications and design constraints for the technical solution. Those skilled persons can use different methods to implement the described functions for each specific application, but such implementations should not be considered beyond the scope of the present application.

Those skilled in the art can clearly understand that, for convenience and concise description, the corresponding processes in the foregoing method embodiments may be referred to for the specific working processes of the above-described system, apparatus, and unit, and details are not repeated here.

It should be understood that the system, apparatus, and method disclosed in the several embodiments provided in the present application may be implemented in other ways. For example, the apparatus embodiments described above are merely illustrative. For example, the division of the units is only a logical function division, and there may be other divisions in actual implementation. For example, multiple units or components may be combined or may be integrated into another system, or some features can be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit.

If the functions are implemented in the form of software functional units and sold or used as an independent product, they can be stored in a computer readable storage medium. Based on this understanding, the essence, or the part that contributes to the prior art, or part, of the technical solutions of the present application can be embodied in the form of a software product. The computer software product is stored in a storage medium, including several instructions used to cause a computer device (which may be a personal computer, a server, or a network device, etc.) to execute all or part of the steps of the methods described in the various embodiments of the present application. The aforementioned storage medium includes: a U disk, a mobile hard disk, a Read-Only Memory (ROM), a Random Access Memory (RAM), a magnetic disk, an optical disk, or other media that can store program codes.

The above description is only specific implementations of the present application, but the protection scope of the present application is not limited thereto. Any person skilled in the art can easily think of changes or substitutions within the technical scope disclosed in the present application, which should be covered within the protection scope of the present application. Therefore, the protection scope of the present application shall be subject to the protection scope of the claims.

What is claimed is:

1. A load control method, comprising:
sending, by a network device, a system broadcast message, wherein the system broadcast message comprises a first configuration parameter, and the first configuration parameter is used to control whether a terminal performs a two-step random access procedure;
wherein the first configuration parameter comprises second indication information and a first control parameter, wherein,
the second indication information is used for the terminal to determine whether the two-step random access procedure is capable of being performed;
the first control parameter is used to make the terminal to judge whether to perform a switching from the two-step random access procedure to a four-step random access procedure based on the first control parameter, in a case that the second indication information indicates that the terminal is capable of performing the two-step random access procedure.

2. The method according to claim 1, further comprising:
sending, by the network device, first indication information to the terminal, wherein the first indication information is used to instruct the terminal to judge whether to perform a switching from the two-step random access procedure to a four-step random access procedure.

3. The method according to claim 2, wherein the sending, by the network device, the first indication information to the terminal comprises:
carrying, by the network device, the first indication information in a random access response message sent to the terminal.

4. The method according to claim 3, wherein the carrying the first indication information in the random access response message comprises:
carrying the first indication information in a media access control protocol data unit (MAC PDU) in the random access response message.

5. The method according to claim 1, wherein the second indication information comprises a first bitmap; each bit in the first bitmap corresponds to an access control (AC) value, and a value of the bit is used to indicate whether a terminal of the AC value corresponding to the bit is capable of performing the two-step random access procedure.

6. The method according to claim 1, wherein the first control parameter comprises a first random number; and
judging by the terminal whether to perform the switching from the two-step random access procedure to the four-step random access procedure comprises:
determining that the terminal performs the switching from the two-step random access procedure to the four-step random access procedure, if a second random number generated by the terminal is greater than or equal to the first random number;
determining that the terminal performs the two-step random access procedure, if the second random number generated by the terminal is smaller than the first random number.

7. A load control method, comprising:
receiving, by a terminal, a system broadcast message sent by a network device, wherein the system broadcast message comprises a first configuration parameter;
determining, by the terminal based on the first configuration parameter, whether to perform a two-step random access procedure;
wherein the first configuration parameter comprises second indication information and a first control parameter, wherein,
the second indication information is used for the terminal to determine whether the two-step random access procedure is capable of being performed;
the first control parameter is used to make the terminal to judge whether to perform a switching from the two-step random access procedure to a four-step random access procedure based on the first control parameter, in a case that the second indication information indicates that the terminal is capable of performing the two-step random access procedure.

8. The method according to claim 7, further comprising:
receiving, by the terminal, first indication information sent by the network device, wherein the first indication information is used to instruct the terminal to judge whether to perform a switching from the two-step random access procedure to a four-step random access procedure.

9. The method according to claim 8, wherein the receiving, by the terminal, the first indication information sent by the network device comprises:
obtaining, by the terminal, the first indication information from a random access response message sent by the network device.

10. The method according to claim 9, wherein a media access control protocol data unit (MAC PDU) in the random access response message carries the first indication information.

11. The method according to claim 7, wherein the second indication information comprises a first bitmap; each bit in the first bitmap corresponds to an access control (AC) value, and a value of the bit is used to indicate whether a terminal of the AC value corresponding to the bit is capable of performing the two-step random access procedure.

12. The method according to claim 7, wherein the first control parameter comprises a first random number;
judging by the terminal whether to perform the switching from the two-step random access procedure to the four-step random access procedure comprises:
determining that the terminal performs the switching from the two-step random access procedure to the four-step random access procedure, if a second random number generated by the terminal is greater than or equal to the first random number;
determining that the terminal performs the two-step random access procedure, if the second random number generated by the terminal is smaller than the first random number.

13. A load control apparatus, comprising:
a processor and a memory, wherein the memory is configured to store a computer program, and the processor is configured to call and run the computer program stored in the memory to:
send a system broadcast message, wherein the system broadcast message comprises a first configuration parameter, and the first configuration parameter is used to control whether a terminal performs a two-step random access procedure;

wherein the first configuration parameter comprises second indication information and a first control parameter, wherein, the second indication information is used for the terminal to determine whether the two-step random access procedure is capable of being performed;

the first control parameter is used to make the terminal to judge whether to perform a switching from the two-step random access procedure to a four-step random access procedure based on the first control parameter, in a case that the second indication information indicates that the terminal is capable of performing the two-step random access procedure.

14. The apparatus according to claim 13, wherein the processor is configured to call and run the computer program to send first indication information to the terminal, wherein the first indication information is used to instruct the terminal to judge whether to perform a switching from the two-step random access procedure to a four-step random access procedure.

15. The apparatus according to claim 14, wherein the processor is configured to call and run the computer program to carry the first indication information in a random access response message sent to the terminal.

16. The apparatus according to claim 15, wherein a media access control protocol data unit (MAC PDU) in the random access response message carries the first indication information.

17. A load control apparatus, comprising:
a processor and a memory, wherein the memory is configured to store a computer program, and the processor is configured to call and run the computer program stored in the memory to execute the method according to claim 7.

18. The apparatus according to claim 17, wherein the processor is configured to call and run the computer program to receive first indication information sent by the network device, wherein the first indication information is used to instruct the terminal to judge whether to perform a switching from the two-step random access procedure to a four-step random access.

19. The apparatus according to claim 18, wherein the processor is configured to call and run the computer program to obtain the first indication information from a random access response message sent by the network device.

20. The apparatus according to claim 19, wherein a media access control protocol data unit (MAC PDU) in the random access response message carries the first indication information.

* * * * *